July 5, 1966 E. C. RORK 3,258,834
HIGH ENERGY RATE FORGING METHOD
Filed Feb. 13, 1964 2 Sheets-Sheet 1
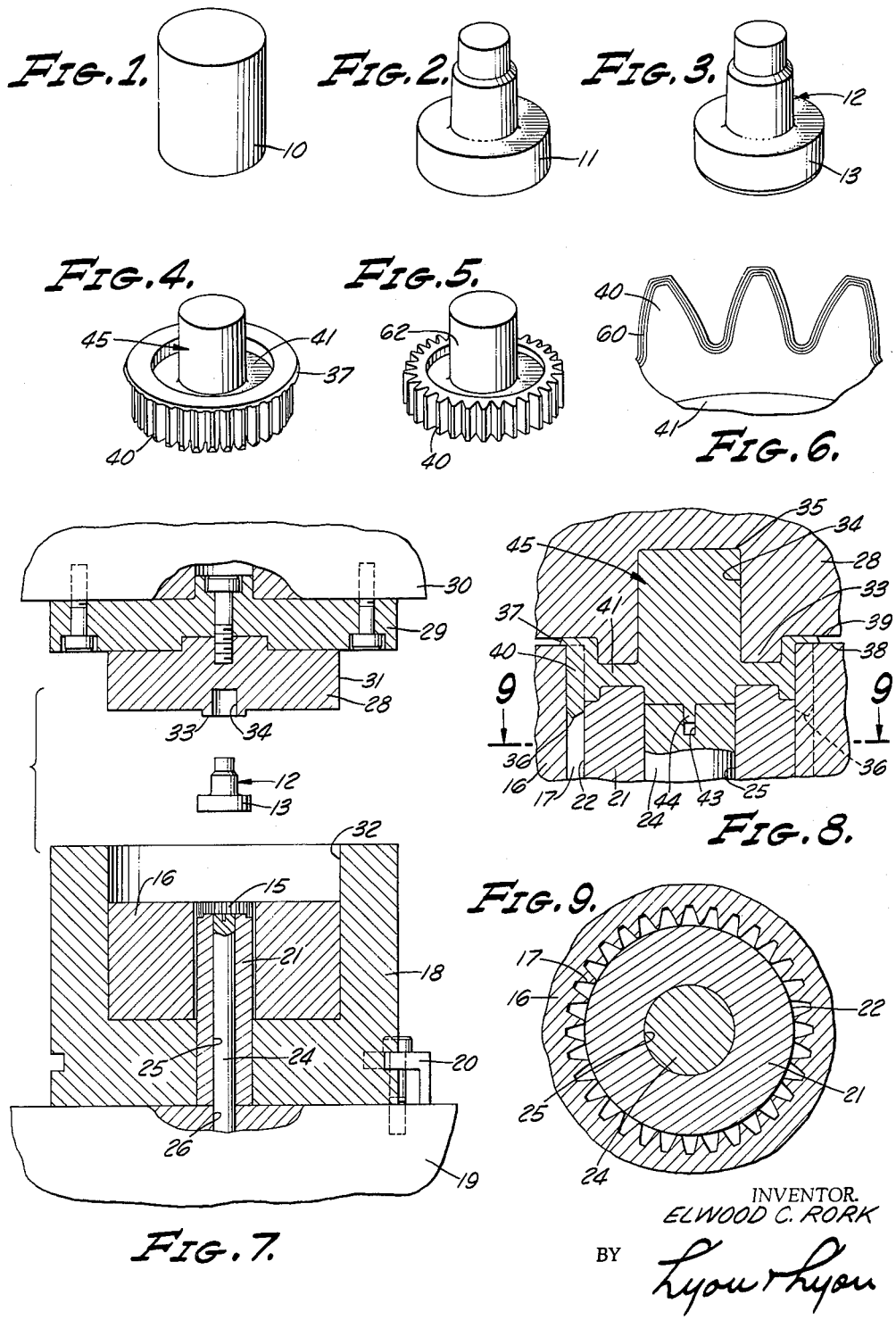
INVENTOR.
ELWOOD C. RORK
BY Lyon & Lyon
ATTORNEYS INVENTOR.
ELWOOD C. RORK
BY Lyon+Lyon
ATTORNEYS United States Patent Office 3,258,834
Patented July 5, 1966

3,258,834
HIGH ENERGY RATE FORGING METHOD
Elwood C. Rork, Pacific Palisades, Los Angeles, Calif., assignor to Precision Forge Company, Santa Monica, Calif., a corporation of Nevada
Filed Feb. 13, 1964, Ser. No. 344,757
10 Claims. (Cl. 29—159.2)

This invention relates to high energy rate forging of metal parts and is directed to the method steps employed as well as to the product produced by the method. The invention will be described in connection with method steps in hot-forging a metal spur gear, but it is to be understood that this is by way of illustration and not of limitation.

In accordance with this invention, high energy rate forgings are produced between a stationary bolster die and a ram die moving at high speed. Only a single blow is struck and the forged part is promptly ejected from the dies. The high rate of speed from the moving die causes the metal to flow as if it were in a plastic state, and the metal moves laterally at the moment of impact to take the precise shape of small indentations and projections provided in the confining die. This process has been found to be particularly advantageous for hot forging of steel spur gears with integral gear teeth.

Conventional forging method utilizing closed dies do not produce complete gears with integral gear teeth but produce only gear blanks which are generally circular in shape and having slightly greater outer diameter than that of the desired gear. Excess material must ordinarily be removed from all surfaces of the gear during machining operations subsequent to forging. The normal 3° to 7° draft angle required by conventional forging techniques contributes to the excess stock which must be removed by machining after forging. Moreover, the requirement for draft eliminates any possibility of forming finished spur gear teeth on the forged part in the forging operation, since the teeth must be uniform in profile across their entire width. Also because of shape limitations inherent in conventional forging techniques, subsequent machining operations to form the gear teeth serve to expose end grain of the metal on the tooth surfaces. The grain of the metal produced by the conventional forging does not follow the outline of the gear teeth, and hence maximum use of the mechanical properties of the material is not obtained. The configuration of the forged part is ordinarily limited to upset ratios of approximately one and one-half to one. Furthermore, conventional forging techniques cause decarbonization of the surface and produce scale.

By contrast, the high energy rate forging method of this invention overcomes or minimizes the foregoing deficiencies and disadvantages and produces metal spur gears which require no machining on the web and only finished grinding on the gear-tooth profile. The new process eliminates the ordinary machining operations and tooling setups to form the web and the gear teeth and subsequent burring operations necessitated by machining. These economies are possible because the high energy rate forging method does not require that draft be designed into the dies and because the forged part may be accomplished in a single forging blow, producing the gear teeth by lateral flow of the metal. The process also causes the metal grain flow to follow the outline or contour of the finished tooth profile. This optimum grain flow constitutes a superior structure capable of operation at higher stress levels. Upset ratios of five-to-one may be obtained, resulting in greater capability of forging device part configurations. The method of the present invention also permits the forging operation to be accomplished at lower temperatures, thus minimizing decarbonization and scaling of parts.

Other and more detailed objects and advantages will appear hereinafter.

The accompanying drawings show steps in the new method of producing a forged steel gear with integral teeth and hub, and show how this is accomplished with forging dies mounted in a high-impact forging machine.

FIGURES 1, 2, 3, 4, and 5 show successive stages in forging the spur gear from a steel blank.

FIGURE 6 is a fragmentary side view of the forged gear with integral gear teeth, showing how the flow lines of the metal follow the tooth contours.

FIGURE 7 is a sectional view of the forming dies and the preformed blank prior to the high energy rate forging step.

FIGURE 8 is a fragmentary sectional view showing the position of the dies and forged parts at the instant that the forging blow is completed.

FIGURE 9 is a transverse sectional view taken substantially on the lines 9—9, as shown in FIGURE 8.

Figure 10:
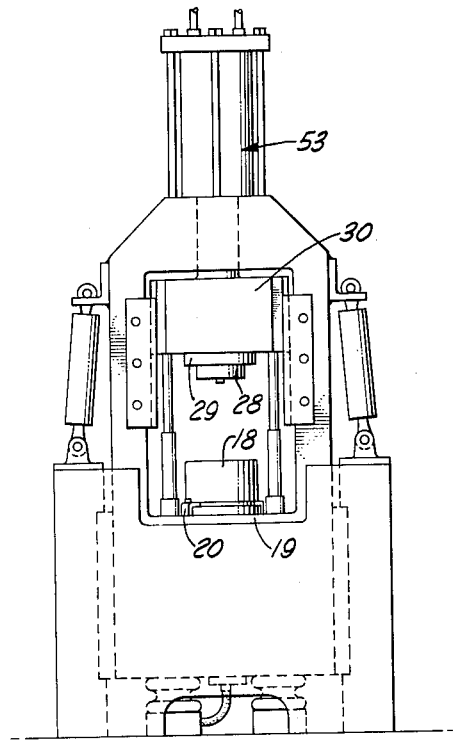
FIGURE 10 is a side elevation of one form of high energy rate forging machine which may be used in connection with the forging dies for carrying out the method of this invention.

Referring to the drawings, the blank 10 as shown in FIGURE 1 is cut from a length of steel bar stock and is then hot-forged by any convenient process to produce the formed blank 11 shown in FIGURE 2. This formed blank 11 comprises a stepped stem having an enlarged flange at one end. After the formed blank has cooled, the shank is chucked in a lathe, and the surface 13 is machined by a lathe tool to form a smooth, cylindrical surface of uniform diameter. This machined, preformed blank 12, as shown in FIGURE 3, is then heated to a temperature of 1800° F. to 2000° F. and is placed in the die cavity 15, as shown in FIGURE 7. The stationary die 16 is relatively thick in an axial direction, and it is provided with a central opening having internal gear teeth 17 formed therein and extending for the full length of the opening. This stationary die 16 is slidably received in a metal holder 18, secured to the stationary bolster 19 by suitable clamps 20. A hollow post 21 has an outer cylindrical surface 22 slidably received by the crowns of the internal gear teeth 17 on the die 16. The lower end of the post 21 rests on the bolster 19. A movable ejection pin 24 is slidably mounted within the central opening 25 and the part 21.

If the upper end of the opening in the die 16 becomes worn after a period of use, this upper portion may be removed by machining away the upper portion of the die. This die-shortening may be repeated at intervals, as required.

The ejector pin is slidably mounted in an opening 26 in the stationary bolster 19 and is supported by ejector mechanism, not shown, which is used to project the pin 24 to expel the forging from the die cavity 15.

The upper die 28 is carried on a pipe 29 attached to the vertically movable ram 30. The outer perimeter 31 of the upper die 28 is adapted to enter within the bore 32 on the lower die holder 18. The lower face of the upper die 28 is provided with an annular projecting boss 33 and a central axially extending opening 34.

When the hot preformed blank 12 is placed in the die cavity 15 and rests on the upper end of the hollow post 21, the ram 30 carrying the upper die 28 is caused to descend at very high speed. The center opening 34 in the upper die 28 moves down over the shank portion of the preformed blank 12, and a single high energy rate impact blow is delivered.

FIGURE 8 shows the position of the die parts and forging at the end of the downward movement of the upper die 28. At the moment of impact, the metal in the forged part moves radially outward into the spaces between the internal gear teeth 17 provided on the lower die 16. The metal is extruded downward in a series of pointed ends 36, which extend below the upper outer edge of the center post 21, and a ring of excess metal or flash 37 is formed between opposing faces 38 and 39 on the lower die 16 and the upper die 28, respectively. The rapid flow of metal radially to form integral gear teeth 40 on the forged body 41 is caused by the very high velocity of the moving die 28 at the instant of impact. It has been found that a minimum speed of 600 inches per second is needed to achieve this effect, and speeds as high as 1100 inches per second of the upper die have been used with excellent results.

The temperature of the formed blank 12 prior to the impact blow is lower than forging temperatures for conventional forging apparatus. Thus, if the formed blank 12 is made of steel the forging temperature can be in the range of 1800° F. to 2000° F., and this lower temperature is advantageous since it minimizes objectionable segregation of the constituents in the steel.

Air or gas in the die cavity at the moment of impact escapes radially between the upper and lower dies and downward through the spaces between the axially extending internal gear teeth 17 on the lower die 16. Also, a central axial hole 43 of small diameter may be provided in the upper end of the ejector pin 24. Air or gas is compressed in the lower end of this opening 43 when metal moves axially into the open end of the small bore under the impact forge blow.

It is desirable to remove the impact forging 45 from the dies as soon as possible after the single forging blow has been delivered, in order to minimize the annealing effect of the hot metal of the forging 45 in contact with the die cavity surfaces of the dies 28 and 16. The ejector pin 24 is therefore lifted quickly by mechanism, not shown, to eject the forging 45 from the die cavity 15 as soon as the ram 30 is retracted to separate the dies 28 and 16.

Figure 12:
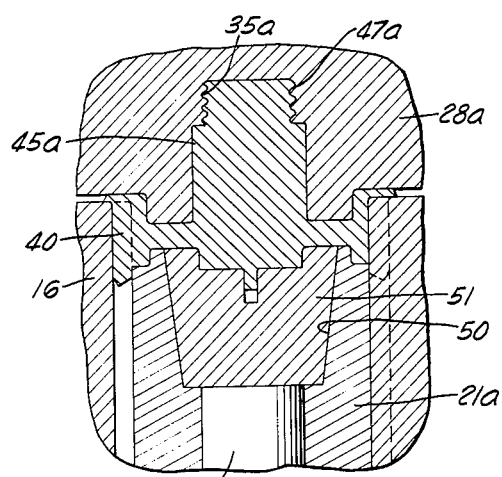
FIGURE 12 is a sectional view similar to FIGURE 8, showing a modification.

In the case of the particular forging as shown in the drawings, the gear body 41 is integrally joined to a shaft on one side. Advantage may be taken of this constructional requirement in the completed part to cause the forging to remain in the upper die and to move promptly out of the cavity 15 in the lower die 16 when the dies are separated. As shown in the modification of FIGURE 12, this advantage is achieved by means of the internal threads 35a, formed within the upper die 28a. The high energy rate impact blow causes metal in the forged part to flow into these internal threads 35a and produce an externally threaded end portion 47a on the forging 45a. The forging 45a is thus removed from the upper die 28a by turning it about its axis to cause separation of the threads 35a and 47a. The threaded end 47a is subsequently removed in a machining operation.

The hollow post 21 and ejector pin 24 may be the same as shown in FIGURE 8 or may be modified to some extent as shown in FIGURE 12. In FIGURE 12, the upper end of the hollow post 21a is provided with a tapered socket 50 for reception of a tapered insert 51. The upper end of this insert is shaped to form the lower face of the gear forging 45a. When the ejector pin 24a is lifted after separation of the dies 16 and 28a, the insert 51 is lifted out of the socket 50.

FIGURE 10 shows one form of impact forging apparatus which may be employed in carrying out the method of this invention. The device includes a ram 30 movable downward at high speed by means of a pneumatic power cylinder assembly 53. The upper die 28 moves with the ram 30. The lower die assembly, including the part 18, rests on the stationary bolster 19. Impact-forming apparatus of this same general type is shown in the Ottestad et al. Patent 2,932,951, granted April 19, 1960.

An important advantage in the product produced by the high energy rate forging method of this invention is illustrated in FIGURE 6, wherein it is shown that the grain flow lines 60 follow the outline of the profile of the gear teeth 40. These flow lines show the grain of the metal by inspection, using conventional techniques and involving the use of etching materials. The integral body and gear teeth construction having flow lines as shown in FIGURE 6 constitutes a superior structure capable of sustaining higher stresses in operation and having important advantages in fatigue.

Figure 11:
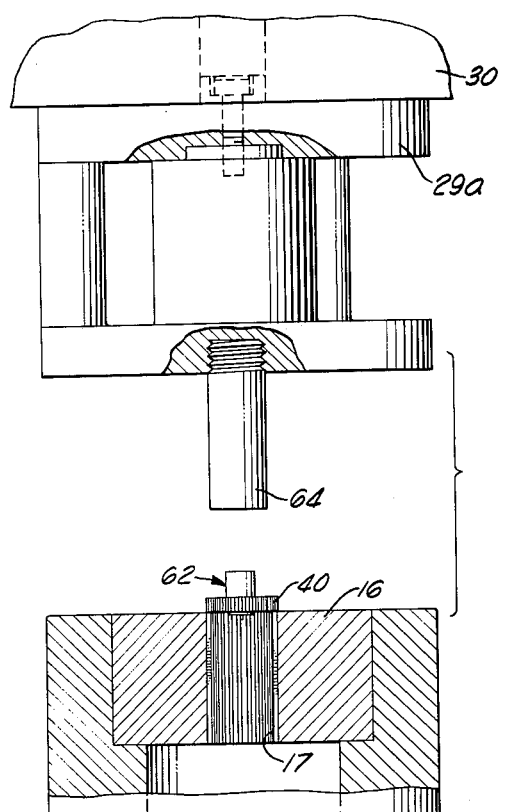
FIGURE 11 is a side elevation partly in section and showing the step of "sizing" the forged gear teeth by driving the previously forged gear axially through the same staitonary die which was used in forging the part initially.

After the forged part is withdrawn from between the dies 28 and 16, the flash ring 37 is removed on one side of the gear teeth 40 and the extending pointed end 36 of the gear teeth are also removed. At the same time, the threaded portion 47a, if any, may be removed, and the forged part then has the appearance shown in FIGURE 5. The part is then reheated to a temperature in the range of 1600° F. to 1800° F. and subjected to a tooth-sizing operation using the same lower die 16 which was employed in the impact forging operation. The forged part 62 is placed in the upper portion of the central opening of the die 16 as shown in FIGURE 11, and the gear teeth 40 are intermeshed with the internal gear teeth 17 in the upper part of the die 16. The part 62 enters the upper end of the die 16 because it was originally formed with that part of the die 16. A plunger 64 is then moved downward to drive the part 62 axially through the die 16, and the part 62 falls into a space 65 provided within the die holder 18a. A lateral access opening 66 is formed in the holder 18a to permit withdrawal of the part 62 after it has passed downward through the interior of the die 16. This operation of driving the heated forged gear 62 axially through the internal gear teeth 17 in the die 16 sizes the gear teeth 40 and further contributes to their dimensional accuracy and uniformity. Gear teeth having class 2 dimensional accuracy are readily produced by this method without any machining operations whatever on the gear teeth. If desired, the forged parts may be carburized and the two surfaces ground to provide gears of class 3 accuracy. In any event, a superior structure is produced by reason of the fact that the grain flow lines follow the profile of the teeth 40.

While the parts 18a and 29a shown in FIGURE 11 are adapted to be used on the moving ram 30 and the stationary bolster 19, it is not necessary to use the high energy rate impact machine for performing the tooth-sizing operation, and this can be accomplished by other conventional devices.

Having fully described my invention, it is to be understood that I am not to be limited to the details herein set forth, but that my invention is of the full scope of the appended claims.

I claim:

1. The process of forging a metal gear having a body and a plurality of gear teeth integral with the body, comprising: placing a hot metal blank in a die cavity having an encircling wall provided with internal gear teeth, said hot metal blank having a lower temperature than conventional forging temperatures thereby minimizing objectionable segregation of the constituents in said blank, and striking the hot metal blank with a forming die moving axially at high speed to produce a single high energy rate impact blow to form the body and cause radial flow of metal into the internal gear teeth of said enclosing wall, and thereby form integral gear teeth on the body.

2. The process of forging a metal spur gear having a body and a plurality of gear teeth integral with the body, comprising: placing a hot metal blank in a die cavity having an encircling wall provided with internal gear teeth, said hot metal blank having a lower temperature than conventional forging temperatures thereby minimizing objectionable segregation of the constituents in said blank, and striking the hot metal blank with a forming die moving axially at high speed to produce a single high energy rate impact blow to form the body and cause radial flow of metal into the internal gear teeth of said enclosing wall, and thereby form integral gear teeth on the forged body, removing flash from the forged part formed by the high energy rate impact below, reheating the part, and then driving it axially through said internal gear teeth on the die cavity wall to size the gear teeth.

3. The process of forging a metal part having a body and a plurality of small projections and indentations on its surface, comprising: placing a hot metal blank in a die cavity having an encircling wall provided with small projections and indentations, said hot metal blank having a lower temperature than conventional forging temperatures thereby minimizing objectionable segregation of the constituents in said blank, and striking the hot metal blank with a forming die moving axially at a rate in excess of 600 inches per second to produce a single high energy rate impact blow to form the body and cause radial flow of metal into the small projections and indentations of said enclosing wall, and thereby form corresponding projections and indentations on the forged body.

4. The process of forging a steel gear having a body and a plurality of gear teeth integral with the body, comprising: placing a hot steel blank in a die cavity having an encircling wall provided with internal gear teeth, said hot metal blank having a lower temperature than conventional forging temperatures thereby minimizing objectionable segregation of the constituents in said blank, and striking the hot steel blank with a forming die moving axially at a rate in excess of 600 inches per second to produce a single high energy rate impact blow and cause radial flow of steel into the internal gear teeth of said enclosing wall, and thereby form integral gear teeth on the body.

5. The process of forging a steel spur gear having a body and a plurality of gear teeth integral with the body, comprising: placing a hot steel blank in a die cavity having an encircling wall provided with internal gear teeth, said hot metal blank having a lower temperature than conventional forging temperatures thereby minimizing objectionable segregation of the constituents in said blank, striking the hot steel blank with a forming die moving axially at a rate in excess of 600 inches per second to produce a single high energy rate impact blow and cause radial flow of steel into the internal gear teeth of said enclosing wall, and thereby form integral gear teeth on the body, removing flash from the forged part formed by the high energy rate impact blow, reheating the forged part to a lower temperature and then driving the hot reheated part axially through said internal gear teeth on the die cavity wall to size the gear teeth.

6. The process of forging a steel gear having a body and a plurality of gear teeth integral with the body, comprising: placing a hot steel blank in a die cavity having an encircling wall provided with internal gear teeth, the temperature of the steel blank being in the range of 1800° F. to 200° F., and striking the hot steel blank with a forming die moving axially at a rate in excess of 600 inches per second to produce a single high energy rate impact blow and cause radial flow of steel into the internal gear teeth of said enclosing wall, and thereby form integral gear teeth on the body.

7. The process of forging a steel spur gear having a body and a plurality of gear teeth integral with the body, comprising: placing a hot steel blank in a die cavity having an encircling wall provided with internal gear teeth, the temperature of the steel blank being in the range of 1800° F. to 2000° F., striking the hot steel blank with a forming die moving axially at a rate in excess of 600 inches per second to produce a single high energy rate impact blow and cause radial flow of steel into the internal gear teeth of said enclosing wall, and thereby form integral gear teeth on the body, removing flash from the forged part formed by the high energy rate impact blow, reheating the forged part to a lower temperature and then driving the hot reheated part axially through said internal gear teeth on the die cavity wall to size the gear teeth.

8. The process of forging a steel gear having a body and a plurality of gear teeth integral with the body, comprising: placing a hot steel blank in a die cavity having an encircling wall provided with internal gear teeth, said hot metal blank having a lower temperature than conventional forging temperatures thereby minimizing objectionable segregation of the constituents in said blank, and striking the hot steel blank with a forming die moving axially at a rate between 600 and 1100 inches per second to produce a single high energy rate impact blow and cause radial flow of steel into the internal gear teeth of said enclosing wall, and thereby form integral gear teeth on the body.

9. The process of forging a steel spur gear having a body and a plurality of gear teeth integral with the body, comprising: placing a hot steel blank in a die cavity having an encircling wall provided with internal gear teeth, said hot metal blank having a lower temperature than conventional forging temperatures thereby minimizing objectionable segregation of the constituents in said blank, striking the hot steel blank with a forming die moving axially at a rate between 600 and 1100 inches per second to produce a single high energy rate impact blow and cause radial flow of steel into the internal gear teeth of said enclosing wall, and thereby form integral gear teeth on the body, removing flash from the forged part formed by the high energy rate impact blow, reheating the forged part to a lower temperature and then driving the hot reheated part axially through said internal gear teeth on the die cavity wall to size the gear teeth.

10. The process of forging a steel spur gear having a body and a plurality of gear teeth integral with the body, comprising: placing a hot steel blank in a die cavity having an encircling wall provided with internal gear teeth, the temperature of the steel blank being in the range of 1800° F. to 2000° F., striking the hot steel blank with a forming die moving axially at a rate in excess of 600 inches per second to produce a single high energy rate impact blow and cause radial flow of steel into the internal gear teeth of said enclosing wall, and thereby form integral gear teeth on the body, removing flash from the forged part formed by the high energy rate impact blow, and subsequently performing a sizing operation upon said integral gear teeth.

References Cited by the Examiner

UNITED STATES PATENTS

| | | | |
|---|---|---|---|
| 637,653 | 11/1899 | Parish | 72—470 X |
| 1,632,533 | 6/1927 | Brauchler | 29—159.2 |
| 2,285,575 | 6/1942 | Elbertz | 72—376 |
| 2,964,838 | 12/1960 | Schober | 29—159.2 |

JOHN F. CAMPBELL, *Primary Examiner.*

THOMAS H. EAGER, *Examiner.*